United States Patent Office 3,437,503
Patented Apr. 8, 1969

3,437,503
MANUFACTURE OF PIGMENT COMPOSITIONS
Joseph Paul Massam and David Seaman, Manchester, England, assignors to Imperial Chemical Industries Limited, Millbank, London, England, a corporation of Great Britain
No Drawing. Filed Sept. 15, 1966, Ser. No. 579,498
Claims priority, application Great Britain, Sept. 17, 1965, 39,721/65, 39,722/65
Int. Cl. C09b 67/00
U.S. Cl. 106—309    9 Claims

ABSTRACT OF THE DISCLOSURE

A process for producing a composition for pigmentation of an organic medium which includes salt-milling a pigment with a resin which is at least 5% soluble in the organic medium and preferably softening and rehardening the resin.

---

This invention relates to the manufacture of pigment compositions.

It is known that the dispersibility of pigments in oils may often be improved by suspending the pigment in an aqueous solution or dispersion of a surface active agent and adding a precipitant which converts the agent into a water-insoluble, oil-soluble form. Thus, for example, rosinated pigments may be obtained by suspending a pigment in an aqueous solution of sodium or potassium rosinate and adding an acid to precipitate free rosin, or a soluble calcium or barium salt to precipitate the insoluble calcium or barium rosinate.

According to the invention we provide a process for the manufacture of pigment composition for the pigmentation of an organic medium said process comprising salt-milling a pigment with at least 5% by weight of a solid resinous substance which is soluble in said medium to the extent of at least 5% by weight and then dissolving out the salt.

Preferably the amount of resinous substance used in the process of our invention does not exceed 2 parts by weight for every 3 parts by weight of pigment, so that the percentage of pigment in the pigment composition finally obtained is at least 60%. Compositions containing such high proportions of pigment are more readily accepted by pigment users, for example paint manufacturers because they are advantageous over compositions containing low proportions of pigment, being less bulky and so enabling transport and storage costs to be reduced, and above all because they minimise any deleterious effect which the resin constituent may have upon the properties of the medium to be pigmented.

The term salt-milling, sometimes called salt-grinding refers to a technique in which a pigment is reduced to a fine state of subdivision by grinding it with a soluble substance, for example a salt, usually sodium chloride, carbonate or sulphate or calcium chloride. In the process of our invention salt-milling should be continued until there is produced an intimate and homogenous mixture of pigment particles, preferably having an average particle size less than 2 microns, and particles of resinous substance of similar or smaller particle size. Dissolution of the salt after milling then gives an aqueous suspension of intimately mixed pigment and resin particles.

After carrying out the salt-milling step in our process the soluble substance may be dissolved out with water, dilute acid or any solvent which does not dissolve the resinous substance.

In a preferred embodiment of the process of our invention the resinous substance is softened and then rehardened. We believe that in many cases at least a partial softening and rehardening occurs during the salt-milling operation. In general, however, we are able to improve the products by deliberately softening and rehardening after completion of the salt-milling operation, for example either during or after the operation of dissolving the salt.

With many resinous substances softening and re-hardening may be accomplished by heating and then cooling. It is convenient to carry out the softening operation concurrently with the step of dissolving out the salt by raising the temperature of the water or dilute acid used for extraction.

If desired, however, other methods of softening the resinous substance may be used. Thus there may be added to an aqueous suspension of salt-milled pigment and resinous substance a liquid which is a solvent for the resinous substance and has a water solubility of at least 0.1% by weight. This operation may conveniently be carried out concurrently with the step of dissolving out the salt. Water miscible liquids such as acetone or alcohol may be used, or liquids such as toluene which are only slightly soluble in water. If desired the temperature of the mixture may be raised. Rehardening can be brought about by washing away the solvent with water. It is also possible to soften the resinous substance by adding to the aqueous suspension of salt milled pigment and resinous substance a liquid of such a nature and in such quantity as to produce an aqueous mixture which softens the resin only when the temperature is raised. Rehardening of the resinous substance may then be brought about in one of several ways. Water may be added to produce a mixture from which the resin is no longer able to extract sufficient solvent to soften it, or the temperature may simply be lowered. Alternatively the solvent, if sufficiently volatile, may be removed by distillation, or the softened resinous substance may be rehardened by a chemical treatment for example by adding calcium or barium chloride to form a calcium or barium salt of the resinous substance. After rehardening the resin by any suitable method, the pigment compositions may be separated from the liquor and dried.

Drying of the pigment compositions obtained in the process of the invention should be carried out under conditions which do not soften the resinous substance.

The pigments used in the process of our invention may be organic, inorganic or carbon black pigments or mixtures of any such pigments.

As examples of organic pigments there may be mentioned azo pigments, vat dye pigments, triphendioxazine pigments, phthalocyanine pigments for example copper phthalocyanine, its nuclear chlorinated derivatives and copper tetraphenyl or octaphenyl phthalocyanine, vat dye and other heterocyclic pigments for example linear quinacridone, lakes of acid, basic and mordant dyestuffs, and the various pigments of the organic type which are enumerated in Volume 2 of "Colour Index 2nd edition," published jointly in 1956 by the Society of Dyers and Colourists and the American Association of Textile Chemists and Colorists, under the heading of "Pigments" and in subsequent authorised amendments thereto. Our process is particularly valuable however with a pigment of the kind which is customarily subjected to salt milling, e.g., a phthalocyanine or quinacridone pigment.

As examples of inorganic pigments there may be mentioned chrome pigments including the chromates of lead, zinc, barium and calcium and various mixtures and modifications such as are commercially available as pigments of greenish-yellow to red shades under the names primrose, lemon, middle, orange, scarlet and red chromes. Modified chrome pigments may contain for example sulphate radicals and/or addition metals such as aluminium, molybdenum and tin. Further examples of inorganic pigments are titanium dioxide, zinc oxide, Prussian Blue and its mixtures with chrome yellows which are known as Brunswick Greens or chrome greens, cadmium sulphide and sulphoselenide, iron oxides, vermilion and ultramarine. As applied to inorganic pigments the invention is of especial value with chrome pigments, Prussian Blue and Brunswick Greens since these pigments are intrinsically difficult to disperse in organic media. It is also of great value with titanium dioxide, which is ordinarily subjected to expensive treatments in order to improve dispersibility. The resinous or vitreous substances used in our process may be of natural or synthetic origin and the choice of substance will depend upon the nature of the particular organic material which is to be pigmented with the pigment composition. Our pigment compositions may contain any resinous substance which is soluble to the extent of at least 5% in the organic material to be pigmented.

Resinous substances which are of great value in our process comprise rosin and chemically modified rosins such as hydrogenated rosin, polymerised rosin, diproportionated rosin and esterified rosin, and rosin which has been subjected to more than one such modification treatment. If desired salts, e.g. calcium or barium salts of rosin or chemically modified rosin may be used. Other resinous substances which are of value in the pigment compositions of the invention comprise polymers of vinyl alkyl benzene and copolymers of vinyl alkyl benzenes with alkyl methacrylates or dialkyl fumarates. Such polymers and copolymers are described and claimed in United Kingdom Patent Nos. 941,386, 957,440 and 957,984. Mixtures of resinous substances may be present in the compositions of the invention if desired, and are advantageous in some cases.

Our process is valuable because it enables pigment treatments hitherto carried out as separate processes to be combined into a single step. Thus a known method for improving the dispersibility of a pigment (e.g., quinacridone pigment) in organic media comprises salt-milling the pigment, dissolving out the salt, adding the resultant aqueous suspension to a solution of rosin-alkali metal salt and then acidifying to precipitate the rosin or precipitating an alkaline earth or heavy metal salt of the rosin. Our process surprisingly enables this improvement in dispersibility to be obtained in a single step. Indeed our process is remarkable in that it produces pigment compositions with superior dispersibility to those from the known two-stage process.

Our process is also valuable in that it enables resins insoluble in alkaline solutions to be incorporated in the pigment compositions.

Some of the pigment compositions obtained by the process of our invention (particularly when the resinous substance is deliberately softened and rehardened after completion of the salt milling step) are of the type described and claimed in United Kingdom Patent No. 978,242. That patent claims a solid pigment composition for the pigmentation of an organic material, said composition comprising a finely divided organic or carbon black pigment and a resinous substance which is soluble to the extent of at least 5% by weight in the organic material, and the composition being characterised in that it contains at least 60% by weight of pigment and that the volume concentration (as therein defined) of pigment in the composition when under a uniform compressive pressure of 20 pounds per square inch is less than 18% in the case of an organic pigment and less than 13% in the case of carbon black.

Such pigment compositions are valuable because they are very easily dispersible in organic materials, e.g., paint or printing ink media or casting, moulding or extrusion materials.

The manufacturing process described in United Kingdom patent specification No. 978,242 comprises producing an intimate mixture of (a) an organic or carbon black pigment in paste form obtained by electrolyte fluocculation of an aqueous dispersion and (b) a resinous substance having the properties stated above in a paste form obtained either by electrolyte fluocculation of an aqueous dispersion or by precipitation from an aqueous solution of a salt, both (a) and (b) being substantially free from any dispersing agent in the chemical form originally present in the aqueous dispersion, and treating said intimate mixture in such a way as to soften the resinous substance and then reharden it.

The present invention provides an alternative and more easily operated process for the manufacture of pigment compositions which are easily dispersible in organic media and may be of the type claimed in United Kingdom Patent No. 978,242.

If desired the salt-milling step in our process may be carried out in the presence of a small amount of organic liquid to control the crystal form of the pigment. As examples of organic liquids which may be used in this way we mention alcohols, esters, ketones, aldehydes, aliphatic and aromatic hydrocarbons, chlorobenzenes, amines, formamide, dimethyl formamide, carbon tetrachloride, chloroform, perchloroethylene and trichloroethylene. The proportion of liquid may conveniently be from 5 to 100% by weight of the pigment present, the upper limit being set by the requirement that the mixture shall behave in the mill substantially as a dry powder. The production of particular crystal forms of certain pigments in the presence of such liquids is already known—see for example United Kingdom Patents Nos. 685,582, and 828,052.

In a particular embodiment of our invention we provide a process for the manufacture of a pigment composition for pigmentation of an organic medium, the said composition containing copper phthalocyanine in $\beta$-crystal form and the process comprising salt-milling crude copper phthalocyanine with a mixture of:

(a) From 5 to 67% of its weight of a solid resinous substance which is soluble in said medium to the extent of at least 5% by weight (b) An N-alkyl-monocyclic arylamine in amount insufficient to prevent the mixture in the mill from behaving substantially as a dry powder, dissolving out the salt and N-alkyl-monocyclic arylamine from the mixture and softening and then rehardening the resinous substance.

By the expression "crude" copper phthalocyanine we means copper phthalocyanine in the form resulting from synthesis, for example from phthalic acid or anhydride, urea and a copper salt by heating in an organic liquid. N-alkyl-monocyclic arylamines which are especially valuable in this embodiment are the alkylanilines, particularly dimethyl-, diethyl- and monomethyl-aniline.

The invention is illustrated but not limited by the following examples in which the parts are by weight.

EXAMPLE 1

25 parts of crude lin-quinacridone, 10 parts of ground and sieved ester of wood rosin (Foral 105—see note 1, after table), 2 parts of dimethylformamide, 140 parts of anhydrous sodium carbonate are rolled in a cylindrical vessel with 1,750 parts of round head nails and stainless steel balls of various sizes for three days. The powder is then separated from the balls and nails and added to 2,000 parts of water with stirring. The suspension is filtered, washed free of soluble salts and dried at 70° C.

The product has good dispersibility in alkyd resin paint media. Foral 105 has a softening point of approximately 105° C. and is soluble in alkyd paint media to the extent of at least 5%.

EXAMPLE 2

70 parts of crude copper phthalocyanine, 30 parts of ground and sieved wood rosin (softening point 70° C.) and 600 parts of anhydrous sodium carbonate are rolled in a cylindrical vessel with 7,000 parts of round head nails and stainless steel balls of various sizes for three days. The powder is then separated from the balls and nails and added carefully to a stirred solution of 600 parts of concentrated sulphuric acid in 8,000 parts of water at 70° C. The suspension is allowed to cool to room temperature and is then filtered and washed acid free with water. The press paste is then dried in a current of air at 40° C.

The product has a pigment volume concentration of 11.2% under a pressure of 20 pounds per square inch (measured by the method described in United Kingdom specification No. 978,242).

By mixing 65 parts of this product with 85 parts of a letterpress varnish in a horizontal dough mixer for 30 minutes a satisfactory blue ink is obtained. Wood rosin is soluble in letterpress varnish to the extent of at least 5%.

When this example is repeated, using dilute sulphuric acid at 25° C. instead of 70° C. to dissolve the salt, so that the wood rosin does not soften, the product is similar but somewhat inferior to that already described, and disperses moderately well in lithographic varnish under the conditions indicated.

When this example is repeated, replacing the 30 parts of wood rosin by 30 parts of sodium carbonate a product is obtained which has a pigment volume concentration of 21.3% and does not disperse satisfactorily in letterpress varnish under the conditions indicated.

Alternatively in this example the sodium carbonate can be replaced by anhydrous sodium sulphate and the extraction carried out with water instead of sulphuric acid. The products are closely similar to those already described.

EXAMPLE 3

Example 2 is repeated using 60 parts of crude copper phthalocyanine and 40 parts of wood rosin. The product disperses satisfactorily in letterpress varnish under the conditions indicated.

EXAMPLE 4

Example 2 is repeated using 80 parts of crude copper phthalocyanine and 20 parts of wood rosin. The product disperses satisfactorily in letterpress varnish under the conditions indicated.

EXAMPLE 5

Example 2 is repeated using 90 parts of crude copper phthalocyanine and 10 parts of wood rosin. The product disperses satisfactorily in letterpress varnish under the conditions indicated.

EXAMPLE 6

Example 2 is repeated, using 30 parts of ground and sieved "Polypale" resin (Registered trademark—Hercules Powder Co.) in place of the wood rosin, and an extraction temperature of 90° C. The resin softens under these conditions and the product disperses satisfactorily in letterpress varnish under the conditions indicated in Example 2. This product also disperses satisfactorily in alkyd paint medium by stirring at 7,000 revolutions per minute for 30 minutes.

"Polypale" resin is soluble in letterpress varnish and in alkyd paint medium to the extent of at least 5%.

The following table summarises further preparations of pigment compositions by salt milling pigments with various resins according to the technique described in Example 2 above. Dispersibilities indicated in the last column are according to the tests given in Example 2 in the case of letterpress varnish and Example 6 in the case of alkyd paint medium.

| Example | Pigment | Resin | Salt extracted with— | Pigment Volume Concentration, Percent | Dispersibility |
| --- | --- | --- | --- | --- | --- |
| 7 | Copper phthalocyanine (70%) | Foral 105 [1] (30%) | Water at 95° C | | Satisfactory in letterpress varnish. |
| 8 | Copper phthalocyanine (90%) | Foral 105 [1] (10%) | do | 13.8 | Do. |
| 9 | Copper phthalocyanine (70%) | Resin [2] (30%) | Water at 98° C | | Do. |
| 10 | Copper phthalocyanine (70%) | Copolymer [3] | Dilute H$_2$SO$_4$ at 90° C | 10.0 | Do. |
| 11 | Indanthrone (70%) | Polypale Resin (30%) | do | 11.2 | Satisfactory in alkyd medium. |
| 12 | Indanthrone (100%) | None | do | 54 | Not satisfactory in alkyd medium. |
| 13 | Monolite yellow GLS [4] (70%) | Wood Rosin (30%) | do | 11.8 | Satisfactory in letterpress varnish. |
| 14 | Monolite yellow GLS (100%) | None | do | 18.7 | Not satisfactory in letterpress varnish. |

[1] Foral 105 is a resin marketed by Hercules Powder Co. It normally has a softening point of 105° C. but softened at 95° C. in fine particle form. In letterpress varnish its solubility is greater than 5% by weight.

[2] The resin used in Example 9 is obtained as follows:
2,400 parts of wood rosin is melted and 278 parts of commercial quality cresol added, followed by 205 parts of paraformaldehyde and 1¼ parts of magnesium oxide. The temperature is raised to 200° C. during 2¾ hours and kept at 200° C. for 6 hours whilst steam is blown through to remove traces of unreacted cresol. On cooling, the molten mass sets to a solid resin.
This product is soluble in letterpress varnish to the extent of at least 5%.

[3] The copolymer used in Example 10 is obtained as follows:
27 cc. of stearic acid, 426 cc. of vinyltoluene, 183 cc. of butylmethacrylate and 27 cc. of t-dodecylmercaptan are stirred in 1713 cc. of water at 50° C. 318 cc. of 1.51 N ammonia are added followed by 5.4 cc. of 100 vols. hydrogen peroxide in 60 cc. of water.
The temperature is carefully raised to 90° C. over 90 minutes and the suspension is stirred at 90–95° C. for 1 hour, then cooled and sieved through a 60 mesh British Standard sieve. The latex is acidified, filtered and washed acid free. The precipitated resin is dried at 30° C. and sieved through a 30 mesh British Standard sieve.
This copolymer is soluble in letterpress varnish to the extent of at least 5%.

[4] Monolite yellow GLS is Pigment Yellow 13 of "Colour Index" Second Edition.

EXAMPLE 15

70 parts of Supra Lemon Chrome 4GS (Imperial Chemical Industries Ltd.), 30 parts Pioneer R31 (a zinc/calcium rosinate marketed by Frederick Boehm Ltd.) and 600 parts anhydrous sodium sulphate are salt-milled for 3 days as in Example 1. The milled charge is isolated into 8,000 parts water at 95° C. After cooling the slurry is filtered, washed and dried in an oven at 70° C.

The product has a pigment volume concentration of 5.1%. It disperses satisfactorily in gravure ink medium by stirring at 7,000 revolutions per minute for 30 minutes.

This example is repeated except that the resin is omitted and replaced by an equal weight of anhydrous sodium sulphate. The product has a pigment volume concentration of 20.5%. It does not disperse satisfactorily in gravure ink media by stirring as indicated.

Pioneer R31 is soluble in gravure ink medium to the extent of at least 5%.

EXAMPLE 16

70 parts of crude copper phthalocyanine, 30 parts of ground and sieved wood rosin, 14 parts diethylaniline and 600 parts anhydrous sodium carbonate are milled for two days as in Example 2. The salt-milled powder is worked up as in Example 2.

The product which contains copper phthalocyanine in β-crystallographic form, has a pigment volume concentration of 13.1% and disperses in letterpress varnish as described in Example 2 to give a satisfactory blue ink.

When this example is repeated except that the 30 parts of wood rosin are omitted and replaced by anhydrous sodium carbonate, the product has a pigment volume concentration of 24.5%. It does not disperse satisfactorily as described in Example 2.

EXAMPLE 17

70 parts crude lin-quinacridone, 30 parts of ground and sieved "Polypale" resin, 7 parts dimethylformamide and 600 parts anhydrous sodium carbonate are salt-milled for 3 days as described in Example 6. The salt-milled powder is worked up as described in Example 6.

The product which contains lin-quinacridone in γ-crystallographic form, disperses satisfactorily in alkyd paint medium by stirring as described in Example 6.

When this example is repeated, except that the 30 parts of "Polypale" resin are omitted and replaced by 30 parts of anhydrous sodium carbonate, the product has a pigment volume concentration of 25.0%. It does not disperse satisfactorily in alkyd paint medium by stirring as described in Example 6.

EXAMPLE 18

70 parts of crude copper phthalocyanine, 30 parts of H.M. limed "Polypale" resin (a modified rosin calcium salt), 14 parts of dimethylaniline and 600 parts of anhydrous sodium carbonate are milled for two days as described in Example 2. The product is isolated by dissolving out the salt in water, reslurrying in water, adding sufficient 50% sulphuric acid to give a 5% solution, heating to 90° C., cooling to room temperature, filtering, washing and drying at 40° C. It contains copper phthalocyanine in β-crystal form and disperses satisfactorily in letterpress varnish by the technique described in Example 2.

We claim:

1. A process for the manufacture of a pigment composition for the pigmentation of an organic medium, said process comprising salt-milling a pigment with from 5 to 67% of its weight of a solid resinous substance which is soluble in said medium to the extent of at least 5% by weight, the salt-milling being continued until the pigment particles in the mixture have an average particle size of less than 2 microns, and then dissolving out the salt.

2. Process according to claim 1 wherein the resinous substance is softened and then rehardened.

3. Process according to claim 2 wherein softening and rehardening is accomplished by heating and cooling respectively.

4. Process according to claim 1 wherein the pigment is selected from the group consisting of phthalocyanine pigment and quinacridone pigment.

5. A process according to claim 4 wherein the salt-milling step is carried out in presence of an organic liquid to control the crystal form of the pigment, the amount of organic liquid being insufficient to prevent the mixture in the mill behaving substantially as a dry powder.

6. Process according to claim 2 wherein the pigment is selected from the group consisting of phthalocyanine pigment and quinacridone pigment.

7. Process according to claim 3 wherein the pigment is selected from the group consisting of phthalocyanine pigment and quinacridone pigment.

8. A process for the manufacture of a pigment composition for pigmentation of an organic medium, the said composition containing copper phthalocyanine in β-crystal form and the process comprising salt-milling crude copper phthalocyanine with a mixture of:
   (a) from 5 to 67% of its weight of a solid resinous substance which is soluble in said medium to the extent of at least 5% by weight
   (b) an N-alkyl-monocyclic arylamine in amount insufficient to prevent the mixture in the mill from behaving substantially as a dry powder, dissolving out the salt and N-alkyl-monocyclic arylamine from the mixture and softening and then rehardening the resinous substance.

9. A process according to claim 8 wherein the N-alkyl-monocyclic arylamine is selected from the group consisting of dimethylaniline, diethylaniline and monomethylaniline.

References Cited

UNITED STATES PATENTS 3,228,780   1/1966   Grelat.

JAMES E. POER, *Primary Examiner.*

U.S. Cl. X.R.

106—308, 241